(12) United States Patent
Lehmann et al.

(10) Patent No.: US 9,477,934 B2
(45) Date of Patent: Oct. 25, 2016

(54) ENTERPRISE COLLABORATION CONTENT GOVERNANCE FRAMEWORK

(71) Applicants: Doron Lehmann, Kfar Vradim (IL); Eyal Nathan, Reut (IL); Nimrod Barak, Nes Tziona (IL)

(72) Inventors: Doron Lehmann, Kfar Vradim (IL); Eyal Nathan, Reut (IL); Nimrod Barak, Nes Tziona (IL)

(73) Assignee: SAP Portals Israel Ltd., Ra'anana (IL)

( * ) Notice: Subject to any disclaimer, the term of this patent is extended or adjusted under 35 U.S.C. 154(b) by 143 days.

(21) Appl. No.: 13/943,581

(22) Filed: Jul. 16, 2013

(65) Prior Publication Data

US 2015/0026755 A1 Jan. 22, 2015

(51) Int. Cl.
  *G06F 21/00* (2013.01)
  *G06Q 10/06* (2012.01)
  *G06F 21/62* (2013.01)
  *G06F 21/10* (2013.01)

(52) U.S. Cl.
  CPC ............. *G06Q 10/06* (2013.01); *G06F 21/10* (2013.01); *G06F 21/62* (2013.01)

(58) Field of Classification Search
  CPC .................. G06F 21/60; G06F 21/62; G06F 2221/2141; G06F 21/10; H04L 63/101; H04L 29/06823; H04L 29/06829; H04L 29/06836; H04L 29/06843; G06Q 10/06
  See application file for complete search history.

(56) References Cited

U.S. PATENT DOCUMENTS

| | | | |
|---|---|---|---|
| 6,480,962 B1 * | 11/2002 | Touboul ........................ 726/22 |
| 6,510,406 B1 | 1/2003 | Marchisio | |
| 6,826,568 B2 | 11/2004 | Bernstein et al. | |
| 7,089,233 B2 | 8/2006 | Osias | |
| 7,434,227 B2 | 10/2008 | Scheinkman | |
| 7,475,059 B2 | 1/2009 | Irle et al. | |
| 7,502,779 B2 | 3/2009 | Brockway et al. | |
| 7,568,236 B2 * | 7/2009 | Gbadegesin et al. ........... 726/27 |
| 7,603,357 B1 * | 10/2009 | Gourdol ............ G06F 17/30171 |
| 7,797,315 B2 | 9/2010 | Morisawa | |
| 7,921,137 B2 | 4/2011 | Lieske et al. | |
| 7,945,619 B1 | 5/2011 | Chawla et al. | |
| 7,984,417 B2 | 7/2011 | Ben-Zvi et al. | |
| 8,321,560 B1 * | 11/2012 | Pai ...................... G06F 11/0793 709/224 |
| 8,407,289 B2 | 3/2013 | Chen et al. | |
| 8,751,568 B1 * | 6/2014 | Mears ..................... H04L 67/28 709/203 |
| 8,826,443 B1 * | 9/2014 | Raman et al. ................... 726/26 |
| 8,887,291 B1 * | 11/2014 | Mears ..................... H04L 67/28 713/182 |
| 2002/0087515 A1 | 7/2002 | Swannack et al. | |
| 2003/0054563 A1 | 3/2003 | Ljungstrom et al. | |
| 2004/0162816 A1 | 8/2004 | Irle et al. | |
| 2006/0106866 A1 | 5/2006 | Green et al. | |

(Continued)

OTHER PUBLICATIONS

U.S. Appl. No. 13/417,547, filed Mar. 12, 2013, Nimrod Barak.

(Continued)

*Primary Examiner* — Michael Pyzocha
(74) *Attorney, Agent, or Firm* — Fish & Richardson P.C.

(57) ABSTRACT

The present disclosure describes methods, systems, and computer program products for providing enterprise collaboration content governance. One computer-implemented method includes receiving a content creation request associated with particular content and a context, transmitting the particular content and context for validation of the content creation request. comparing, by operation of a computer, at least one rule and at least one pattern to the transmitted content and context to generate a rule result, determining at least one action result based on the generated rule result, and performing at least one application action based on the determined at least one action result.

20 Claims, 2 Drawing Sheets

(56) References Cited

U.S. PATENT DOCUMENTS

| | | | |
|---|---|---|---|
| 2007/0039045 A1* | 2/2007 | McKee et al. | 726/21 |
| 2007/0266079 A1* | 11/2007 | Criddle | G06Q 10/107 709/203 |
| 2008/0250078 A1* | 10/2008 | Wimberly et al. | 707/202 |
| 2009/0055891 A1* | 2/2009 | Okamoto et al. | 726/1 |
| 2009/0089630 A1 | 4/2009 | Goldenberg et al. | |
| 2010/0131551 A1* | 5/2010 | Benzaken | G06F 21/6245 707/769 |
| 2011/0055902 A1* | 3/2011 | Brodfuehrer et al. | 726/4 |
| 2012/0159565 A1* | 6/2012 | Bray | G06Q 10/10 726/1 |
| 2013/0073621 A1* | 3/2013 | Waddoups | G06F 21/6218 709/204 |
| 2013/0117802 A1* | 5/2013 | Fendt | 726/1 |
| 2013/0127920 A1 | 5/2013 | Grinshpon et al. | |
| 2013/0132420 A1 | 5/2013 | Vainer et al. | |
| 2013/0159824 A1 | 6/2013 | Barak et al. | |
| 2013/0226907 A1* | 8/2013 | Wolf | G06F 17/30554 707/722 |
| 2013/0239180 A1* | 9/2013 | Weller | G06F 17/30893 726/4 |
| 2013/0340030 A1* | 12/2013 | Riley et al. | 726/1 |
| 2014/0033067 A1* | 1/2014 | Pittenger | G06F 21/606 715/751 |
| 2014/0143543 A1* | 5/2014 | Aikas | H04L 67/1097 713/168 |
| 2014/0337932 A1* | 11/2014 | Leggette et al. | 726/4 |
| 2014/0355069 A1* | 12/2014 | Caton et al. | 358/3.28 |
| 2015/0040237 A1* | 2/2015 | Vandervort | G06F 21/6254 726/26 |

OTHER PUBLICATIONS

U.S. Appl. No. 13/438,098, filed Apr. 3, 2012, Nathan et al.
U.S. Appl. No. 13/595,268, filed Aug. 27, 2012, Lehmann et al.
U.S. Appl. No. 13/596,906, filed Aug. 28, 2012, Nimrod Barak.
U.S. Appl. No. 13/614,196, filed Sep. 13, 2012, Barak et al.
U.S. Appl. No. 13/620,361, filed Sep. 14, 2012, Nimrod Barak.
U.S. Appl. No. 13/644,337, filed Oct. 4, 2012, Pelleg et al.
U.S. Appl. No. 13/712,518, filed Dec. 12, 2012, Pariente et al.
U.S. Appl. No. 13/722,665, filed Feb. 21, 2013, Lehmann et al.
U.S. Appl. No. 13/732,792, filed Jan. 2, 2013, Lehmann et al.
U.S. Appl. No. 13/740,858, filed Jan. 14, 2013, Nathan et al.
U.S. Appl. No. 13/904,544, filed May 29, 2013, Lehmann et al.
U.S. Appl. No. 13/916,857, filed Jun. 13, 2013, Lehmann et al.

* cited by examiner

ENTERPRISE COLLABORATION CONTENT GOVERNANCE FRAMEWORK

BACKGROUND

Users of enterprise portal systems (EPS) are able to create content on the EPS, for example downloading/uploading documents, commenting on existing content, posting to blogs, and the like. The content may sometimes include sensitive, confidential, inappropriate, and/or restricted data, such as social security numbers, account numbers/passwords, addresses, phone numbers, etc. The inability to control creation of content on the EPS can result in loss of data/intellectual property, data security violations, transmission of confidential information to unauthorized individuals, offended users, loss of business, and/or violations of various laws and regulations.

SUMMARY

The present disclosure relates to computer-implemented methods, computer-readable media, and computer systems for providing enterprise collaboration content governance. One computer-implemented method includes receiving a content creation request associated with particular content and a context, transmitting the particular content and context for validation of the content creation request. comparing, by operation of a computer, at least one rule and at least one pattern to the transmitted content and context to generate a rule result, determining at least one action result based on the generated rule result, and performing at least one application action based on the determined at least one action result.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the content creation request is received from a client device.

A second aspect, combinable with any of the previous aspects, wherein comparing the at least one rule and the at least one pattern further comprises: generating the rule result based on the comparison result, and transmitting the rule result.

A third aspect, combinable with any of the previous aspects, wherein determining the at least one action further comprises: comparing the generated rule result to at least one action, and transmitting the determined at least one action result.

A fourth aspect, combinable with any of the previous aspects, further comprising: determining at least one associated action, and performing the at least one associated action.

A fifth aspect, combinable with any of the previous aspects, further comprising receiving an administrative request to extend at least one of the at least one rule, the at least one pattern, or the at least one action.

A sixth aspect, combinable with any of the previous aspects, wherein the at least one application action requires additional input to permit the completion of the at least one application action.

The subject matter described in this specification can be implemented in particular implementations so as to realize one or more of the following advantages. First, a content governance framework (CGF) can be used to protect intellectual property, confidential/private/restricted information, and other appropriate data from dissemination within an enterprise portal (EP) following a content creation request. For example, a purposeful/inadvertent attempt to post a company financial report, social security number, private address, or phone number can be blocked before available for viewing on the EP. Second, The CGF can use defined rules/actions to configure content restriction parameters and subsequent actions if a violation of content creation rules have been detected. Third, violations of rules can be tracked and both violators and those in authority can be notified of infractions. Fourth, the CGF can also be used to further restrict an existing EP permission model. For example, all EP users can be allowed to upload documents to a collaboration room (EP permissions based on content (collaboration room 'X') and actions ('upload document')) but only a finance officer will be able to upload financial result documents (CFG permissions based on content). Fifth, the CFG can also help organizations to avoid legal/regulatory violations with respect to release of inappropriate/sensitive/restricted data. Sixth, the use of the CGF can help increase the consistency, tone, quality, and accessibility of content created on the EP. For example, removal of foul language and mature topics can make EP content accessible to a wider audience and ensure that the EP content is perceived as "clean," informative, and of value to EP users. Seventh, the perceived accessibility can increase user comfort/acceptance of the EP content resulting in greater revenue for the EP. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
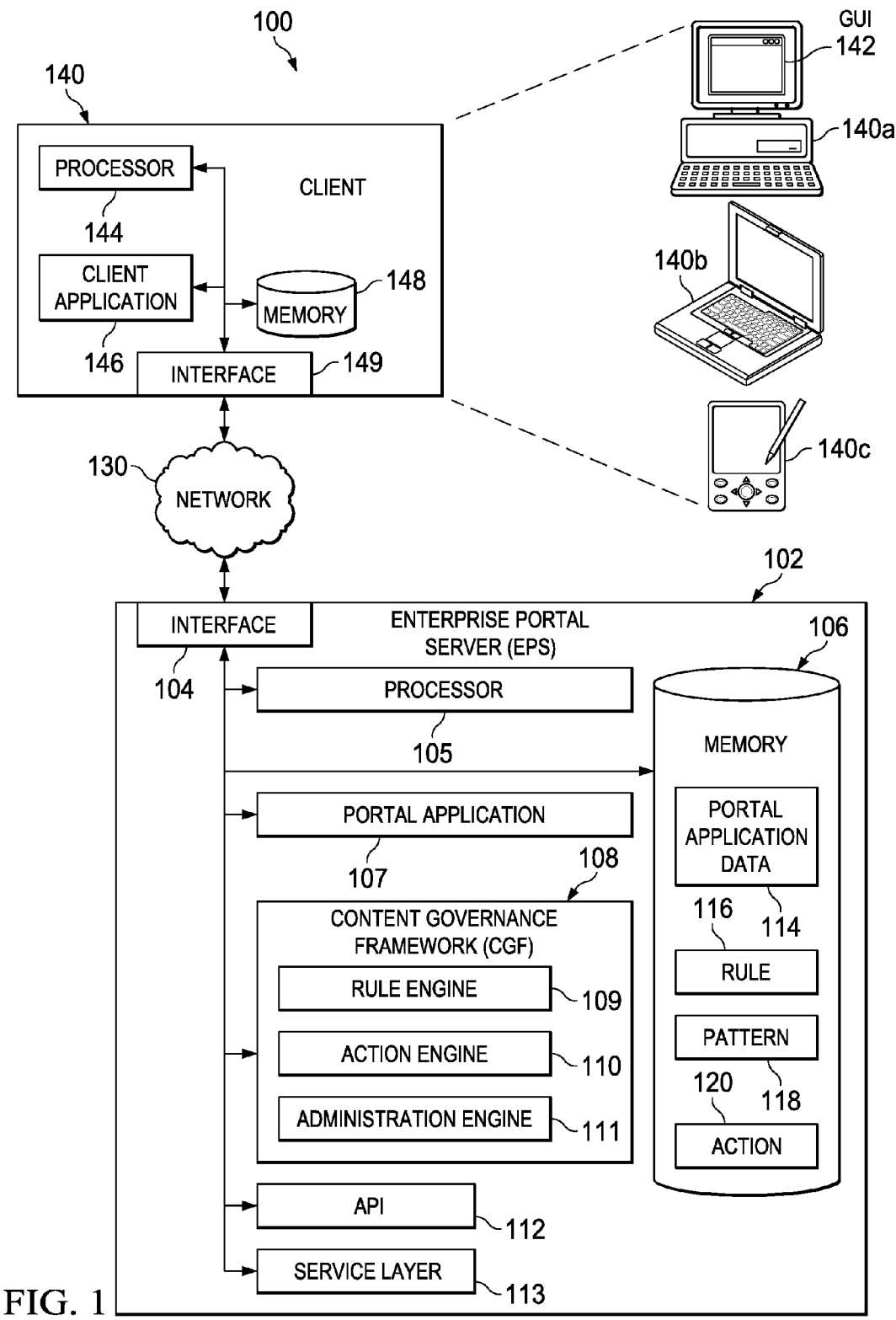
FIG. 1 is a block diagram illustrating an example distributed computing system for providing enterprise collaboration content governance according to an implementation.

This disclosure generally describes computer-implemented methods, computer-program products, and systems for providing enterprise collaboration content governance. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For the purposes of this disclosure, an enterprise portal (EP) is a framework for integrating information, people, and processes across organizational boundaries. An EP provides a secure unified access point, often in the form of a web-based graphical user interface (GUI), and is designed to aggregate and personalize information through application-specific portals. The EP is a de-centralized content contribution, collaboration, and content management system, which keeps the information always updated. With only a web browser, EP users can begin work once they have been authenticated in the EP which offers a single point of access to information, enterprise applications, collaboration spaces, and services both inside and outside an organization. EPs may present information from diverse sources on mobile or other devices in a unified and structured way, for example using HTML container documents, and provide additional services, such as dashboards, an internal search engine, e-mail, news, navigation tools, collaboration tools, and various other features. EPs are often used by enterprises for providing their employees, customers, and possibly additional users with a consistent look and feel, and access control and procedures for multiple applications, which otherwise would have been separate entities altogether.

A content governance framework (CGF) can be used to protect intellectual property, confidential/private/restricted information, and other appropriate data from dissemination within an EP following a content creation request. For example, a purposeful/inadvertent attempt to post a company financial report, social security number, private address, or phone number can be blocked before available for viewing on the EP. The CGF can use defined rules/actions to configure content restriction parameters and subsequent actions if a violation of content creation rules have been detected. Violations of rules can be tracked and both violators and those in authority can be notified of infractions. The CGF can also be used to further restrict an existing EP permission model. For example, all EP users can be allowed to upload documents to a collaboration room (EP permissions based on content (collaboration room 'X') and actions ('upload document')) but only a finance officer will be able to upload financial result documents (CFG permissions based on content). The CFG can also help organizations to avoid legal/regulatory violations with respect to release of inappropriate/sensitive/restricted data. The use of the CGF can help increase the consistency, tone, quality, and accessibility of content created on the EP. For example, removal of foul language and mature topics can make EP content accessible to a wider audience and ensure that the EP content is perceived as "clean," informative, and of value to EP users. Foul language and mature topics can be identified and replaced with other language, characters (such as asterisks, dashes, etc.), labels, etc. The perceived accessibility can increase user comfort/acceptance of the EP content resulting in greater revenue for the EP.

FIG. 1 is a block diagram illustrating an example distributed computing system (EDCS) 100 for providing enterprise collaboration content governance according to an implementation. The illustrated EDCS 100 includes or is communicably coupled with an EP server (EPS) 102 and a client 140 that communicate across a network 130. At a high level, the EPS 102 is an electronic computing device operable to receive, transmit, process, store, or manage data and information associated with the EDCS 100. According to some implementations, EPS 102 may also include or be communicably coupled with an e-mail server, a web server, a caching server, a streaming data server, a business intelligence (BI) server, and/or other suitable server. The following described computer-implemented methods, computer-readable media, computer systems, and components of the example distributed computer system 100 provide enterprise collaboration content governance using a content governance framework (CGF) (described below). For example, the CGF can allow/block the uploading of content to an EPS collaboration page set up between a group of EP users.

In general, the EPS 102 is a server that stores and/or executes one or more portal applications 107 and/or a content governance framework (CGF). The EPS 102 can also interact with user requests/responses sent by clients 140 within and communicably coupled to the illustrated EDCS 100. In some implementations, the one or more portal applications 107 and/or CGF 108 represents one or more web-based applications accessed and executed by the client 140 using the network 130 or directly at the EPS 102 to perform the programmed tasks or operations of a particular portal application 107 and/or the CGF 108.

The EPS 102 is responsible for receiving requests using the network 130, for example data retrieval, user authentication, collaborative content governance, rule/action administration/configuration, and/or any other suitable requests from one or more client applications 146 associated with the client 140 of the EDCS 100 and responding to the received requests by processing said requests in the one or more of a portal applications 107 and/or the CGF 108. In addition to requests from the client 140, requests may also be sent to the EPS 102 from internal users, external or third-parties, other automated applications, as well as any other appropriate entities, individuals, systems, or computers. In some implementations, requests/responses can be sent directly to EPS 102 from a user accessing EPS 102 directly.

In some implementations, any and/or all components of the EPS 102, both hardware and/or software, may interface with each other and/or the interface using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the EPS 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the EPS 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the CGF 108.

The EPS 102 includes an interface 104. Although illustrated as a single interface 104 in FIG. 1, two or more interfaces 104 may be used according to particular needs, desires, or particular implementations of the EDCS 100. The interface 104 is used by the EPS 102 for communicating with other systems in a distributed environment—including within the EDCS 100—connected to the network 130; for example, the client 140 as well as other systems communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The EPS 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the EPS 102. Specifically, the processor 105 executes the functionality required to provide enterprise collaboration content governance.

The EPS 102 also includes a memory 106 that holds data for the EPS 102, client 140, and/or other components of the EDCS 100. Although illustrated as a single memory 106 in FIG. 1, two or more memories may be used according to particular needs, desires, or particular implementations of the EDCS 100. While memory 106 is illustrated as an integral component of the EPS 102, in alternative implementations, memory 106 can be external to the EPS 102 and/or the EDCS 100. In some implementations, the memory 106 includes one or more persistent instances of portal application data 114, a rule 116, a pattern 118, and/or an action 120.

The portal application data 114 can include data and/or content objects, processes, content provider locations, addresses, storage specifications, content lists, access requirements, or other suitable data. For example, for a database content provider, the portal application data 114 may include a database server Internet Protocol (IP) address, URL, access permission requirements, data download speed specifications, etc. associated with the database content provider. The content object can be considered a representation of a business/non-business entity, such as an employee, a sales order, an invoice, an inventory report, a financial report, and may encompass both functions, in the form of methods, and data, such as one or more properties. Content objects also form a point of entry of the functions and data of a system and enable the system to easily share, communicate, display, or otherwise operate with other systems. In some instances, data and/or a content object may be used to share content with other EPS users, such as through updating an EPS collaborative page, posting a comment, etc.

The portal application data 114 can be generated, stored, and/or converted from/into any suitable format or form, for example, binary, text, numerical, a database file, a flat file, or the like. In some implementations, the portal application data 114 can directly accessed by any suitable component of the EDCS 100, for example, the portal application 107, and/or the CGF 108. In some implementations, the portal application data 114 may be updated regularly or at a particular time based on underlying processes and/or data/content objects. While the portal application data 114 is illustrated as an integral component of the memory 106, in alternative implementations, the portal application data 114 can be external to the memory 106 (e.g., stored in memory 148) and/or be separated into both external portal application data 114 and internal portal application data 114 as long as accessible using network 130.

The pattern 118 represents data structures used to scan, compare, contrast, identify, determine, and/or the like content based on a particular rule(s) (described below). In some implementations, pattern 118 can include dictionaries, document templates, regular expressions, role analysis (e.g., is the user a manager, in finance, HR, etc.), document classification verifications, and/or the like. In some implementations, the pattern 118 can be encrypted for security purposes, for example to apply against high-security documents. The list of one or more available patterns 118 can be predefined and/or extended to create custom patterns 118 by appropriate EPS 102 users, for example EPS 102 developers/architects. The action 120 represents data structures, policies, conditions, instructions, constraints, and/or the like used by an action engine 110 (described below) to determine an action to be taken by a portal application 107 based upon the analysis of the user content creation request content compared against the pattern(s) 118. For example, action 120 can include BLOCK, PROCEED, MORE INFORMATION NEEDED, ALERT, and the like. In some implementations, the action 120 can be encrypted for security purposes, for example to apply against high-security documents. The list of one or more actions 120 can be predefined and/or extended to create custom actions 120 by appropriate EPS 102 users, for example EPS 102 developers/architects. The rule 116 generally represents policies, conditions, parameters, variables, algorithms, instructions, constraints, references, and any other appropriate information used by a rule engine 109 (described below) to determine one or more patterns 118 to apply to content requested to be added to the EPS 102 in order to perform an analysis of the pattern 118 against the content to perform an action 120. In other words, a rule can be considered an association of one or more patterns 118 with an action 120. In some implementations, the EDCS 100/CGF 108 (and/or other suitable component) can provide several generic rule types that can be realized by a customer using existing patterns. For example, a "dictionary rule" 116 can be associated with a "foul language" dictionary pattern 118 and an "OBSCURE" action 120 to convert foul language into asterisks, or a "role assignment" rule 116 can be associated with a "role set" pattern 118 "["FINANCE OFFICER ROLE", "FINANCE ANALYSIS ROLE"]" to identify EP users that are assigned to at least one of the roles defined in the pattern 118. In some implementations, the rule 116 can be encrypted for security purposes, for example to apply against high-security documents. The list of one or more rules 116 can be predefined and/or extended to create custom rules 116 by appropriate EPS 102 users, for example EPS 102 developers/architects.

The portal application 107 can be considered a content provider that can include, for example, applications and data on a server and/or external services, business applications, business application servers, databases, RSS feeds, document servers, web servers, streaming servers, caching servers, or other suitable content sources. In some implementations, a particular portal application 107 can use portal application data 114 to provide content to the client 140 and/or other appropriate component of the EDCS 100. The portal application 107 also allows the client 140 to request, view, execute, create, edit, delete, and/or consume EPS 102 content. The portal application 107 interfaces with the CGF 108 to request validation of EP user requests/actions to created content for the EPS 102 and/or to perform any other appropriate operations for providing enterprise collaboration content governance. In some implementations, the portal application 107 interfaces with the CGF 108 using the API 112 and/or the service layer 113. The portal application 107 can be manually configured to request validation of content creation and/or other actions by calling API 112. In some implementations, the portal application 107 can register with the CGF 108 and is informed by the CGF 108 as to when the CGF 108 is to be called. When the portal application 107 registers with CGF 108, the CGF 108 can return an object or other appropriate data structure to the portal application 107 identifying available content governance capabilities.

Once a particular portal application 107 is launched, the particular portal application 107 can be used, for example by a client 140, to interactively process a task, event, or other information/content associated with the EPS 102. In some implementations, the portal application 107 may be a network-based, web-based, and/or other suitable application consistent with this disclosure. For example, a particular portal application 107 may receive a request (a desired user action) from a client 140 browser to upload a document to an EP collaboration page (create content on the EPS 102). The portal application 107 can initiate a request to validate the content creation request with respect to the document to be uploaded and send the content creation request to the CGF 108. The portal application 107 can also receive an action result from the CGF 108 indicating an action that the portal application 107 is take with regard to the request to upload the document, for example, BLOCK, PROCEED, etc.

In some implementations, a particular portal application 107 may operate in response to and in connection with at least one request received from other portal applications 107, other components (e.g., software and/or hardware modules) associated with another EPS 102, and/or other components of the EDCS 100 (whether illustrated or not). In some implementations, the portal application 107 can be accessed and executed in a cloud-based computing environment using the network 130. In some implementations, a portion of a particular portal application 107 may be a web service associated with the portal application 107 that is remotely called, while another portion of the portal application 107 may be an interface object or agent bundled for processing at a remote client 140. Moreover, any or all of a particular portal application 107 may be a child or sub-module of another software module or enterprise application (not illustrated) without departing from the scope of this disclosure. Still further, portions of the particular portal application 107 may be executed or accessed by a user working directly at the EPS 102, as well as remotely at a corresponding client 140. In some implementations, the EPS 102 or any suitable component of EPS 102 or the EDCS 100 can execute the portal application 107.

The content governance framework (CGF) 108 provides core functionality for the provision of enterprise collaboration content governance. The CGF 108 includes a rule engine 109, action engine 110, and administration engine 111. In some implementations, API 112 and/or service layer 113 can be integrated into the CGF 108.

The rule engine 109 is an application/service that analyzes an application of a particular pattern(s) 118 against content requested to be uploaded to the EPS 102. For example, a user indicates with a client 140 a desire in portal application 107 to upload a document (content creation) to a collaboration page associated with the portal application 107. The rule engine 109 receives context information from the portal application regarding the upload request. Context information can include, for example, requesting user, the context to create (here a document), collaboration page of request, members of the collaboration group, and the like. The rule engine 109 determines based on the rule 116 that a document upload request context (as relayed from the portal application 107 to the rule engine 109) requires at least an application of: 1) a document template; 2) a role analysis of users associated with the collaboration page; and 3) a verification of document classification. The rule engine 109 analyzes the application of the appropriate/relevant pattern(s) 118 against the content in view of the request context and generates an analysis/rule result to transmit to the action engine 110.

In some instances, the application of rule 116 can be further based on a user's role in addition to the context. For example, the rule engine could determine that the document requested to be uploaded meets document template format requirements and is not considered to contain classified/restricted content, but that one particular user in the collaboration group is associated with a user role that is not allowed to view the particular document (the requested document to upload could be a financial report and the particular user does not possess an EP user finance role). In this example, the rule engine 109 could generate a BLOCK rule result to transmit to the action engine 110 or a MORE INFORMATION NEEDED rule result in case the particular user is authorized to view the financial report. In this example, the content creator could receive an approval dialog to enter in a user ID/password to authorize the particular user to view the financial report. In another example, the particular user could simply want to make a comment on a document that had been uploaded to the collaboration page. Here, user role may not be considered at all in the context of commenting on a previously updated document but the rule 116 may require that a dictionary scan of the comment text be performed simply because of the context of posting a comment. As a result of the possible application of role/context to rule 116 analysis, a company CEO/member of a finance group could be permitted to publish a particular financial report, but other user roles could not.

In another example, a rule 116 such as "if isFinancialDocument(document) AND NOT(isAssignedToRole(user, FINANCE OFFICER ROLE)) then BLOCK" can be created to be evaluated by the rule engine 109. In case of a financial document upload (determined by the isFinancialDocument rule, which is another rule 116 that checks the document using one or more patterns 118), the uploading EP user's roles are checked to verify they are assigned to the "FINANCE OFFICER ROLE" role. If they are not assigned to the specified role, the result will be a BLOCK action. The action engine 110 is responsible for carrying out the actions, such as returning the error response to the portal application 107, sending email notifications, etc.

In some implementations, the rule engine 109 can allow and/or provide functionality to create "rule sets" which are composite rules composed from other rules 116 using logical. An example of a rule set could include "(RULE_1 AND (RULE_2 OR RULE_3))" or any other appropriate logical combination of rules 116 using logical and/or other operators.

In some implementations, the rule engine 100, rule 116, and/or pattern 118 can restrict content creation requests to particular geographic locations, a particular time (day/week/month, etc.), to a particular device(s), or other restrictive parameters. For example, users requesting to upload content to the EPS 102 from a country/website deemed a security risk due to malware, etc., can be blocked.

The action engine 110 is an application/service that receives the above-described rule result from the rule engine 109 and determines an action that the portal application 107 is to take based on the rule result. In some implementations, the rule engine 109 relays context information to the action engine 110. The action engine 110 accesses the action 120 to determine what actions should be taken by the portal application 107 with respect to the user upload request. For example, if the action engine 110 determines based on the received rule result that there is no issue to prevent the upload of the document to the EPS 102, the action engine 110, among other things, notifies the portal application 107 with an action result to continue with the upload of the document to the collaboration page, for example with a PROCEED action result. If, however, there is a negative issue identified by the rule engine 109, the action engine may determine that the appropriate action 120 is to block the user-requested document upload to the collaboration page and instructs the portal application 107 accordingly with a BLOCK action result.

In some implementations, the action engine 110 can also send messages, emails, SMS/MMS/and equivalent text messages, make telephone calls, raise alerts/alarms, and/or other appropriate notification actions as a result of the received rule result and/or action result. For example, if a received rule result indicates an ALERT, the action engine 110 analysis of action 120 may indicate that a particular person/group should be immediately notified. A possible scenario could include the attempted upload of a classified military/government document to a public collaboration page. In this case, the action engine 110 could alert appropriate personnel of the attempted security breach so immediate action could be taken. Another example could be that the CGF 108 has flagged a particular employee for attempting to upload pornographic material to a company portal a predetermined number of times. The action engine 110 may, in addition to generating a BLOCK action result to transmit to the portal application 107, block the particular employee's account to the EPS 102 and send an email to both the employee and the particular employee's supervisor of the reason for the account block.

The administration engine 111 is any application/service that used to administer/configure rule 116, pattern 118, and/or action 120. In some implementations, the administration engine 111 can generate a GUI for display on the client 140. In other implementations, an administrative GUI can be separately executed on the client 140 to interface with the administrative engine 111. The GUI provides an easy-to-use visual/graphical tool for administration/configuration of the CFG 108. In typical implementations, the administration engine 111 receives configuration requests from the client 140, but in other implementations, configuration requests could be transmitted from any appropriate component of the EDCS 100 or from a source external to the EDCS 100. In some implementations, the configuration requests are JAVA calls to API 112 to register extensions. For example, an EPS 102 developer/architect may wish to add an additional rule 116 that a request to post a comment using the portal application 107 requires a dictionary scan against a different dictionary than the default dictionary. In this instance, the developer/architect would generate an API 112 call to the CGF 108/administrative engine 111 to update the persistent rule 116 and pattern 118 to reflect the new dictionary. The configuration request could include a new rule ID, JAVA object (pattern 118) to invoke when the rule is applied, etc.

In typical implementations, administrative functions are reserved for portal administrators, information technology, portal developers/architects, users of particular roles, and other appropriate personnel. In some implementations, the administrative engine 111 can refuse administrative/configuration actions unless the actions originate from a particular geographic location, during a particular time (day/week/month, etc.), to a particular device(s), or to other restrictive parameter.

The client 140 (e.g., 140*a*-140*c*) may be any computing device operable to connect to or communicate with at least the EPS 102 using the network 130. In general, the client 140 comprises an electronic computing device operable to receive, transmit, process, and store any appropriate data associated with the EDCS 100, for example, the portal application 107, GUIs, utilities/tools, and the like. More particularly, among other things, the client 140 can generate content creation requests and content governance administrative requests with respect to the EPS 102. The client typically includes a processor 144, a client application 146, a memory 148, and/or an interface 149.

The client application 146 is any type of application that allows the client 140 to navigate to/from, request, view, create, edit, delete, administer, and/or manipulate content associated with the EPS 102. In some implementations, the client application 146 can be and/or include a web browser. In some implementations, the client application 146 can use parameters, metadata, and other information received at launch to access a particular set of data from the EPS 102 and/or other components of the EDCS 100. Once a particular client application 146 is launched, a user may interactively process a task, event, or other information associated with the EPS 102 and/or other components of the EDCS 100. For example, the client application 146 can generate and transmit a content creation request and/or a CGF 108 administrative request to the EPS 102. Further, although illustrated as a single client application 146, the client application 146 may be implemented as multiple client applications in the client 140.

The interface 149 is used by the client 140 for communicating with other computing systems in a distributed computing system environment, including within the EDCS 100, using network 130. For example, the client 140 uses the interface to communicate with the EPS 102 as well as other systems (not illustrated) that can be communicably coupled to the network 130. The interface 149 may be consistent with the above-described interface 104 of the EPS 102 or other interfaces within the EDCS 100. The processor 144 may be consistent with the above-described processor 105 of the EPS 102 or other processors within the EDCS 100. Specifically, the processor 144 executes instructions and manipulates data to perform the operations of the client 140, including the functionality required to send requests to the EPS 102 and to receive and process responses from the EPS 102.

The memory 148 typically stores objects and/or data associated with the purposes of the client 140 but may also be consistent with the above-described memory 106 of the EPS 102 or other memories within the EDCS 100 and be used to store data similar to that stored in the other memories of the EDCS 100 for purposes such as backup, caching, and the like.

Further, the illustrated client 140 includes a GUI 142 that interfaces with at least a portion of the EDCS 100 for any suitable purpose. For example, the GUI 142 may be used to view data associated with the client 140, the EPS 102, or any other component of the EDCS 100. In particular, In some implementations, the client application 146 may act as a GUI interface for the portal application 107, administrative engine 111 of the CGF 108, other components of EPS 102, and/or other components of the EDCS 100 (whether illustrated or not). In the case of generating administrative requests, the GUI 142 can be used, in some implementations, to format, save, edit, and/or transmit API 112 calls to the EPS 102 in order to extend CGF 108 functionality and/or persistencies. For example, an EPS 102 user can generate JAVA (or other suitable computing language) API 112 calls to the CGF 108 to extend persistent instances of the rule 116, pattern 118, and/or action 120. In some instances, the client 140 can also be used to edit/update the portal application data 114.

There may be any number of clients 140 associated with, or external to, the EDCS 100. For example, while the illustrated EDCS 100 includes one client 140 communicably coupled to the EPS 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140a-140c) is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the EPS 102 or the client 140 itself, including digital data, visual and/or audio information, or a GUI 142, as shown with respect to the client 140.

Figure 2:
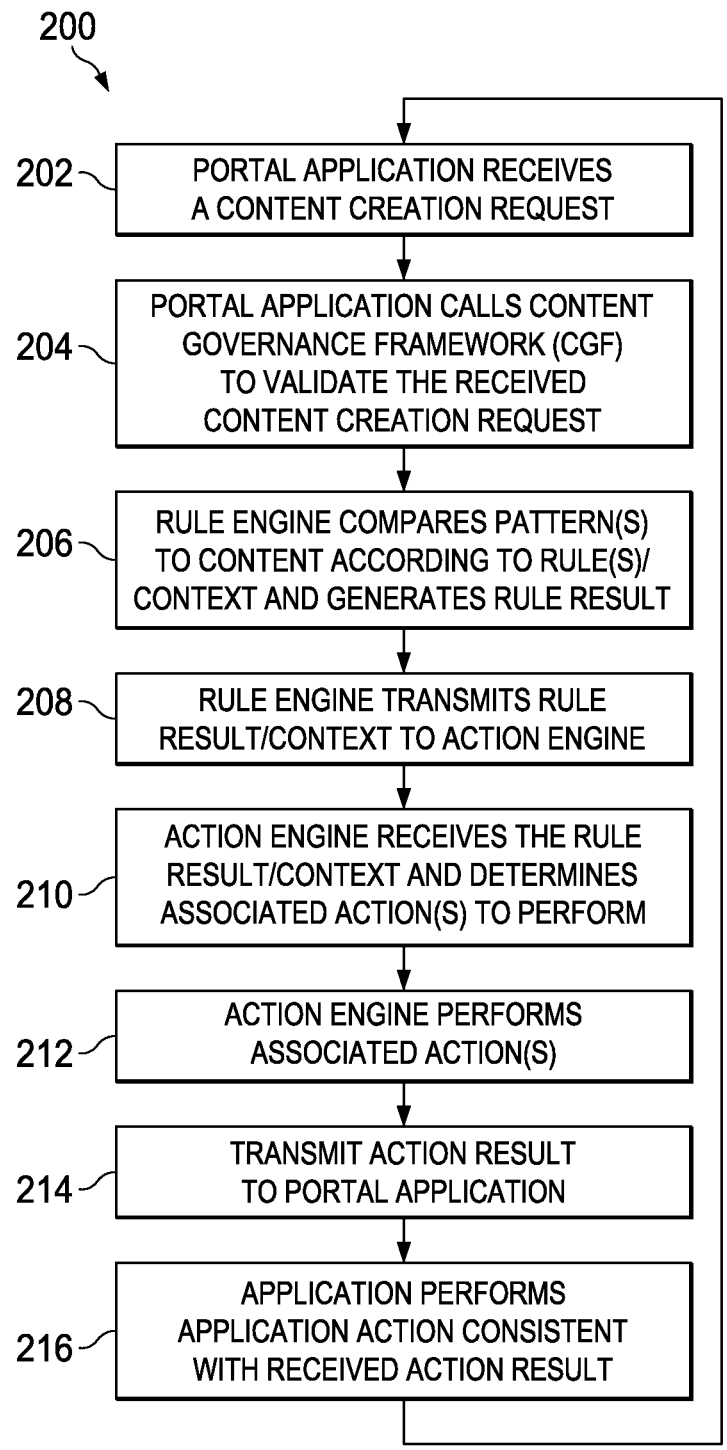
FIG. 2 is a flow chart illustrating a method for providing enterprise collaboration content governance according to an implementation.

FIG. 2 is a flow chart of a method 200 for providing enterprise collaboration content governance according to an implementation. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, or in any order.

At 202, a portal application receives a content creation request. Typically, the content creation request is received from a client interfacing with the portal application. From 202, method 200 proceeds to 204.

At 204, the portal application calls a content governance framework (CGF) to validate the received content creation request. In some implementations, the portal application passes the content creation request, content to be created, as well as context information associate with the content creation request to the CGF. For example, the portal application could pass the content creation request, the content creation user, an EP page the content request originated from, a list of users allowed to access the origination page (for a collaboration page), and the like. From 204, method 200 proceeds to 206.

At 206, a rule engine compares a persistent rule(s) and pattern(s) to the content to be created in light of the supplied context. The rule engine generates a rule result to transmit to an action engine. From 206, method 200 proceeds to 208.

At 208, the rule engine transmits the rule result/context to the action engine. From 208, method 200 proceeds to 210.

At 210, the action engine receives the rule result/context and applies the rule result/context against a persistent action(s) to determine associated action(s) to be performed. From 210, method 200 proceeds to 212.

At 212, the action engine performs determined associated actions. For example, in addition to the need to transmit an action result to the portal application, the action engine could determine that an email should be sent (an associated action) to an employee's supervisor and the employee based on the content creation request. From 212, method 200 proceeds to 214.

At 214, the action engine transmits an action result to the portal application. In some implementations, an action result may not be transmitted to the portal application. For example, the portal application can proceed with the content creation after a set time period or from message/signal received directly from the employee's supervisor or dedicated person/group approving the content creation, etc. From 214, method 200 proceeds to 216.

At 216, the portal application performs an application action consistent with the received action result. In some implementations, the action result can require additional data input from the content creator (e.g., an ID/password) or from another user (e.g., additional approval from a supervisor, etc.). In these instances, a GUI dialog or other applicable data input method can be presented to the content creator, supervisor, etc. requesting the additional data to allow the portal application to proceed with the application action (e.g., content creation). After 216, method 200 stops.

In some alternate implementations, the rule engine/action engine can actually terminate/modify the content creation request. For example, the rule engine/action engine could cancel/modify a database operation issued by the portal application at the request of a user. In these instances, the rule engine/action must take into account the proper context associated with the content creation request and engage in a more active role in control of the content request instead of depending on the portal application to follow an indication returned to the portal application in an action result. In these instances, the rule engine/action engine cleans up any low-level operations, memory, etc. necessary following the termination/modification of a content creation request. The rule engine/action engine can also then notify the portal application as well as appropriate individuals of the actions taken.

In some alternate implementations, rules 116 can be applied in an HTTP layer. In certain instances, HTTP requests to the EP are "intercepted", requests containing relevant content (e.g., POST/PUT requests with specific MIME types—'text/plain', 'application/msword', etc.) are identified, and the CGF invoked to analyze the request data.

FIGS. 1 and 2 illustrate and describe various aspects of computer-implemented methods, computer-readable media, and computer systems for providing enterprise collaboration content governance. While the disclosure discusses the processes in terms of enterprise portals, the described computer-implemented methods, computer-readable media, and computer systems can also be applied to any type of information system. The present disclosure is not intended to be limited to the described and/or illustrated implementations related to portal applications, but is to be accorded the widest scope consistent with the principles and features disclosed herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDFLOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a content upload request to upload particular content on an enterprise portal system (EPS), wherein the content upload request includes at least part of the particular content to be newly uploaded on the EPS and is associated with the particular content and a context of the content upload request, wherein the context of the content upload request includes at least an enterprise portal (EP) user requesting the content upload, an EP collaboration page to which the particular content is requested to be uploaded, and a collaboration group of EP users of the EP collaboration page;
initiating validation of the content upload request;
comparing, by operation of a computer, at least one pattern to the particular content and the context based on at least one rule to generate a rule result, wherein the at least one rule includes a rule specifying that if any user in the collaboration group is associated with a user role that is not allowed to view the particular content, rejecting the content upload request;

determining at least one action result based on the generated rule result, wherein the at least one action result includes a reject content upload action result; and rejecting, by the EPS, the requested content upload on the EPS in response to receiving the content upload request and in response to the determined at least one action result including the reject content upload action result.

2. The method of claim 1, wherein the content upload request is received from a client device.

3. The method of claim 1, wherein comparing the at least one rule and the at least one pattern further comprises:

generating the rule result based on the comparison; and transmitting the rule result.

4. The method of claim 1, wherein determining the at least one action further comprises:

comparing the generated rule result to at least one action; and transmitting the determined at least one action result.

5. The method of claim 1, further comprising:

determining at least one associated action; and performing the at least one associated action.

6. The method of claim 1, further comprising receiving an administrative request to extend at least one of the at least one rule, the at least one pattern, or the at least one action.

7. The method of claim 1, further comprising:

performing, by the EPS, at least one application action in response to the content upload request based on the determined at least one action result, wherein the at least one application action requires additional input to permit the completion of the at least one application action.

8. The method of claim 1, wherein the content upload request is a request from a user to upload a document to the EPS, the uploaded document not previously existing in the EPS.

9. A non-transitory, computer-readable medium storing computer-readable instructions executable by a computer and operable to:

receive a content upload request to upload particular content on an enterprise portal system (EPS), wherein the content upload request includes at least part of the particular content to be newly uploaded on the EPS and is associated with the particular content and a context of the content upload request, wherein the context of the content upload request includes at least an enterprise portal (EP) user requesting the content upload, an EP collaboration page to which the particular content is requested to be uploaded, and a collaboration group of EP users of the EP collaboration page;

initiate validation of the content upload request;

compare at least one pattern to the particular content and the context based on at least one rule to generate a rule result, wherein the at least one rule includes a rule specifying that if any user in the collaboration group is associated with a user role that is not allowed to view the particular content, rejecting the content upload request;

determine at least one action result based on the generated rule result, wherein the at least one action result includes a reject content upload action result; and reject, by the EPS, the requested content upload on the EPS in response to receiving the content upload request and in response to the determined at least one action result including the reject content upload action result.

10. The medium of claim 9, wherein the content upload request is received from a client device.

11. The medium of claim 9, wherein determining the at least one action is further operable to:

compare the generated rule result to at least one action; and transmit the determined at least one action result.

12. The medium of claim 9, further operable to:

determine at least one associated action; and perform the at least one associated action.

13. The medium of claim 9, further operable to receive an administrative request to extend at least one of the at least one rule, the at least one pattern, or the at least one action.

14. The medium of claim 9, further operable to:

perform, by the EPS, at least one application action in response to the content upload request based on the determined at least one action result, wherein the at least one application action requires additional input to permit the completion of the at least one application action.

15. A system, comprising:

a memory configured to contain at least one rule, at least one pattern, and at least one action;

at least one computer interoperably coupled with the memory and configured to:

receive a content upload request to upload particular content on an enterprise portal system (EPS), wherein the content upload request includes at least part of the particular content to be newly uploaded on the EPS and is associated with the particular content and a context of the content upload request, wherein the context of the content upload request includes at least an enterprise portal (EP) user requesting the content upload, an EP collaboration page to which the particular content is requested to be uploaded, and a collaboration group of EP users of the EP collaboration page;

initiate validation of the content upload request;

compare the at least one pattern to the particular content and the context based on the at least one rule to generate a rule result, wherein the at least one rule includes a rule specifying that if any user in the collaboration group is associated with a user role that is not allowed to view the particular content, rejecting the content upload request;

determine the at least one action result based on the generated rule result, wherein the at least one action result includes a reject content upload action result; and reject, by the EPS, the requested content upload on the EPS in response to receiving the content upload request and in response to the determined at least one action result including the reject content upload action result.

16. The system of claim 15, wherein the content upload request is received from a client device.

17. The system of claim 15, wherein determining the at least one action is further configured to:

compare the generated rule result to at least one action; and transmit the determined at least one action result.

18. The system of claim 15, further configured to:

determine at least one associated action; and perform the at least one associated action.

19. The system of claim 15, further configured to receive an administrative request to extend at least one of the at least one rule, the at least one pattern, or the at least one action.

20. The system of claim 15, further configured to:
perform, by the EPS, at least one application action in response to the content upload request based on the determined at least one action result, wherein the at least one application action requires additional input to permit the completion of the at least one application action.

* * * * *